US011659234B1

(12) United States Patent
Du Pont-Thibodeau et al.

(10) Patent No.: US 11,659,234 B1
(45) Date of Patent: May 23, 2023

(54) TECHNIQUES FOR MOVING CONTENT PLAYBACK

(71) Applicant: Amazon Technologies, Inc., Seattle, WA (US)

(72) Inventors: Catherine Du Pont-Thibodeau, Montreal (CA); Ryan Hunter Burnett, Issaquah, WA (US); Bala Sahitya Vadlamani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/673,243

(22) Filed: Feb. 16, 2022

(51) Int. Cl.
*H04N 21/433* (2011.01)
*H04N 21/45* (2011.01)
*H04N 21/437* (2011.01)
*H04N 21/436* (2011.01)

(52) U.S. Cl.
CPC ..... *H04N 21/43615* (2013.01); *H04N 21/437* (2013.01); *H04N 21/4532* (2013.01)

(58) Field of Classification Search
CPC ........... H04N 21/43615; H04N 21/437; H04N 21/4532; H04N 21/442; H04N 21/44204; H04N 21/4661; H04N 21/6587; H04N 21/8456; H04N 21/4825; H04N 21/4227; G10L 15/00; G10L 17/00
See application file for complete search history.

(56) References Cited

U.S. PATENT DOCUMENTS

2021/0297469 A1\* 9/2021 Korb ....................... G06F 3/165

OTHER PUBLICATIONS

U.S. Appl. No. 17/690,924, filed Mar. 9, 2022, Titled: Automated Queue Generation.

\* cited by examiner

*Primary Examiner* — Alazar Tilahun
(74) *Attorney, Agent, or Firm* — Kilpairick Townsend & Stockton LLP

(57) ABSTRACT

Techniques are provided herein for modifying content playback between user devices (e.g., moving the content playback from one device to another). State information may be obtained by a content management engine, the state information describing aspects of historical content streaming corresponding to a plurality of user devices associated with a user profile. A streaming request can be received from a user device. The content to be streamed can be selected by the content management engine based at least in part on the state information. In some embodiments, the playback device is also selected based on the state information. A streaming request is transmitted from the content management engine to a service provider to effectuate the content being streamed to the selected playback device. These techniques enable a user to push or pull content to or from one device to another.

20 Claims, 9 Drawing Sheets

TECHNIQUES FOR MOVING CONTENT PLAYBACK

BACKGROUND

Streaming is a technology used most often to deliver live or real-time content to computers and mobile devices over the Internet. A computing device (e.g., a server) transmits data (e.g., audio and/or video data) as a continuous flow, which allows recipients to begin watching and/or listening almost immediately without requiring the content to be entirely downloaded onto a user device first. As users are streaming such content, they may walk away or otherwise disengage from the device originally playing the content.

BRIEF DESCRIPTION OF THE DRAWINGS

Various embodiments in accordance with the present disclosure will be described with reference to the drawings, in which.

DETAILED DESCRIPTION

Figure 1:
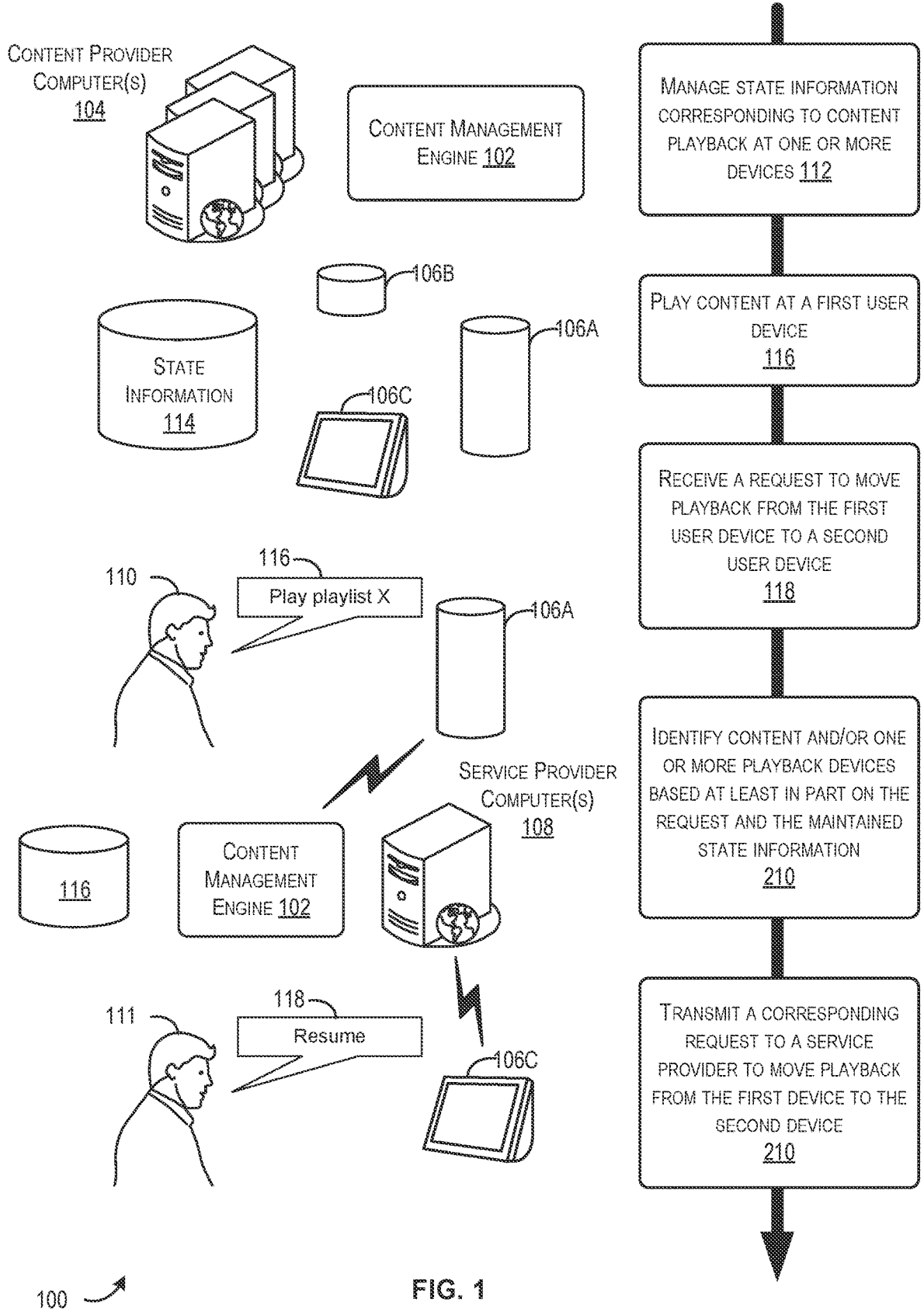
FIG. 1 is a schematic diagram illustrating an example environment suitable for implementing aspects of a content management engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to modifying content playback at one or more user devices (e.g., moving content playback from one device to another). In some embodiments, content may be provided to a user device using streaming technology. A media stream may utilize streaming technology that enables a user device to present the content (e.g., a movie, a podcast, an audio book, a television show, audio and/or video data, etc.) almost immediately without having to wait for the entire content to download before viewing begins. In some embodiments, content may be provided for consumption to a variety of users from a service provider. The content discussed herein may be provided via a service or other computing component operating in a cloud computing environment.

In some embodiments, an application (e.g., a virtual assistant, a chat bot, a web browser, a media application, etc.) of a user device (e.g., a smart speaker, etc.) may be utilized to select content for playback. The user device may be one of many associated with a user's account (e.g., a user profile corresponding to a service provider). By way of example, a user may wake the user device with a designated wake word/phrase (e.g., "Wake up"). The user may then provide a vocal command such as "play songs by [Artist A]." The user device may be configured to send data corresponding to the vocal command (e.g., a device identifier corresponding to the device at which the command was received, audio corresponding to the received command, etc.) to a content management engine operating in the cloud. In some embodiments, the data corresponding to the vocal command may be first processed by an input service configured to identify a service to which the vocal command relates. The input service, upon determining the command corresponds to a particular service (e.g., a music service, a video service, a podcast service, etc.) may transmit any suitable data corresponding to the vocal command (e.g., a textual representation generated from the vocal command, the device identifier, the vocal command, etc.) to the content management engine. The content management engine may determine that the data corresponding to the vocal command does not indicate a particular type of command (e.g., a command to change the device(s) at which content is played, a command that indicates previously played content is to resume, etc.). As a result of this determination, the content management engine may transmit a content request (also referred to as a "streaming request," or "a request," for brevity) to a service corresponding to the type of content requested (e.g., a music service in this example). The music service may then stream the requested content to the user device directly. As the requested content is presented at the user device, state information regarding playback may be transmitted (e.g., by the music service and/or the user device) to the content management engine which may maintain a historical record of the content played at each device associated with the user's account.

During playback, the user may wish to change location. By way of example, the user may be originally listing to music using the device in their bedroom but wishes to relocate to their kitchen. In some embodiments, the user may issue the wake word/phrase at the bedroom device, followed by the command "move my music to the Kitchen." A request may be transmitted by the bedroom device and received by the content management engine (e.g., after potentially being routed by another service). The content management engine may determine that the request received at the bedroom device relates to moving content between devices and may utilize previously received state information that describes the content historically presented at the bedroom device to determine content corresponding to "my music." Said another way, the content management engine may identify music currently being played (or the last music played corresponding to a last music-based command) at the bedroom device and may transmit a request to a service provider computer (e.g., a computer hosting a music service) to request the music be moved from the bedroom device to a device associated with the identifier "Kitchen." In response to the request, the service provider computer may halt playback of the content at the bedroom device and may begin playback of the content at the Kitchen. In some embodiments, playback may begin at a last run time of the content reached at the bedroom device. Thus, playback in the Kitchen begins at the same run time as the run time at which the content was stopped in the bedroom.

As another example, the user may forget to move his music to the Kitchen and instead may travel to the Kitchen while the content is still playing in the bedroom. In this instance, the user can use the wake word/phrase and issue the vocal command "resume." A request may be transmitted, this time by the Kitchen device and received by the content management engine (e.g., after potentially being routed by another service). The content management engine may determine that the request received at the bedroom device relates to moving content between devices and may utilize previously received state information that describes the content historically presented at the device(s) associated with the user profile with which the receiving device (e.g., the Kitchen device) is associated. The content management engine may attempt to identify, from the historical record of the content played at these devices, the content to which "resume" refers. Said another way, the content management engine may identify from the historical record the last content played was a song by Artist A at the bedroom device and may transmit a request to a service provider computer (e.g., a computer hosting a music service) to request the music be moved from the bedroom device to the kitchen device. In response to the request, the service provider computer may halt playback of the content at the bedroom device and may begin playback of the content at the Kitchen. In some embodiments, playback may begin at a last run time of the content reached at the bedroom device. Thus, playback at the kitchen device begins at the same run time as the run time at which the content was stopped in the bedroom.

Utilizing the techniques discussed herein, the content management engine described herein may adapt playback of the content to shift the content playback between devices. Although examples herein may discuss moving content playback from one device to another, it should be appreciated that these examples may be similarly applied when shifting content playback from one to many, many to one device, or many to many devices. Conventional techniques would not allow for a user to push/send content from one device and pull/obtain content playing at another device. However, utilizing the techniques described herein, the user may resume playback from where he left off at any combination of devices of his choosing.

FIG. 1 is a schematic diagram illustrating an example environment 100 suitable for implementing aspects of a content management engine 102, in accordance with at least one embodiment. The environment 100 may include content provider computer(s) 104, user devices 106A, 106B, and 106C (collectively, "user devices 106), and service provider computer(s) 108. The content provider computer(s) 104, the user devices 106, and the remote data provider computer(s) 108 may be communicatively connected via one or more networks (e.g., the Internet, not depicted). For simplicity of illustration, a certain number of components are shown in FIG. 1. It is understood, however, that embodiments of the invention may include more than one of each component.

A method for modifying content playback begins at 112, where the content management engine 102 maintains state information 114. As a non-limiting example, state information 114 may include a current run time of the currently playing content, previously played content identifiers, last run times reached of each of the previously played content instances, historical user input (vocal or otherwise) received at the device, or any suitable data corresponding to any action performed at the device at any suitable time. In some embodiments, every instance of state information may be timestamped with a day and time at which an action corresponding to the information was performed.

Figure 2:
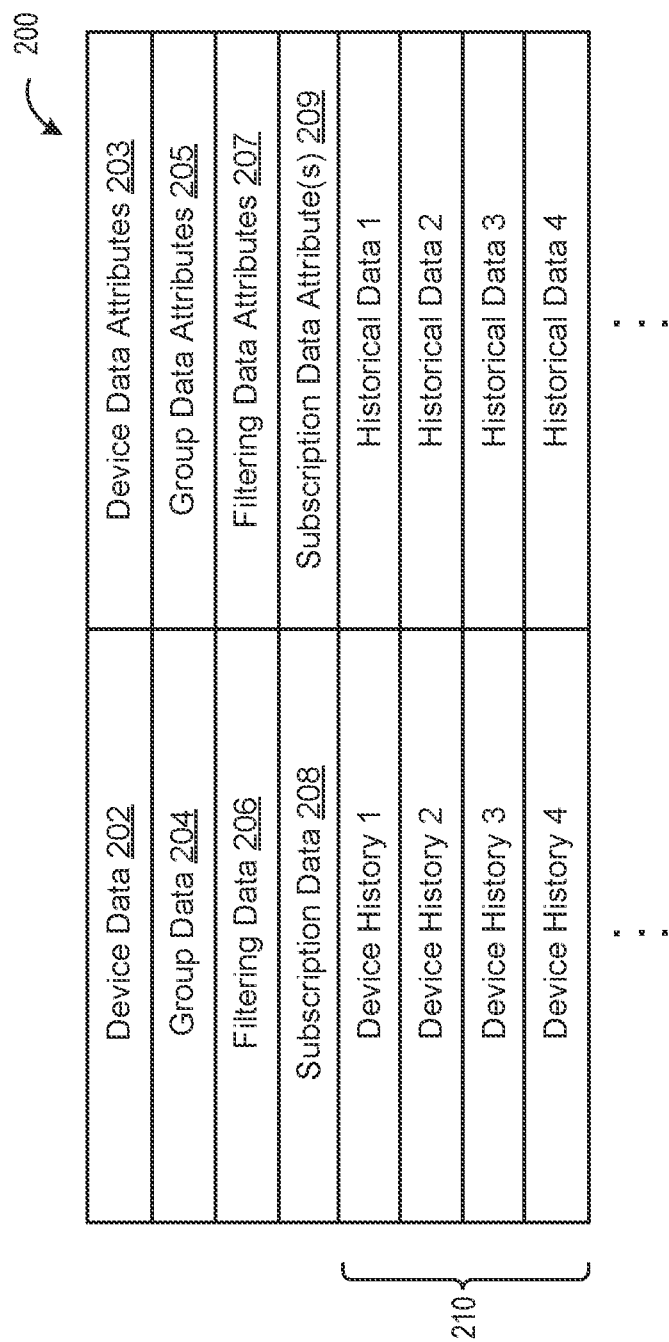
FIG. 2 is a schematic diagram illustrating an example of state information record associated with playback of content at one or more devices, in accordance with at least one embodiment.

FIG. 2 is a schematic diagram illustrating an example of state information record 200 (e.g., an example of the state information 114) associated with playback of content at one or more devices, in accordance with at least one embodiment. In some embodiments, the data stored in state information record 200 may be generally referred to herein as "state information" or "state data."

In some embodiments, the state information record 200 may be associated with a user account (e.g., a user profile). By way of example, the state information record 200 may be associated with a particular user identifier and/or user account corresponding to a content provider (e.g., a music provider, a podcast provider, an audio book provider, etc.). In some embodiments, the content provider may operate a service that streams content to user devices. The state information record 200 may include any suitable data corresponding to currently and/or historically presented content that has been presented at any device associated with the user identifier and/or user account. By way of example only, the state information record 200 may be associated with a user account that is in turn associated with four devices (e.g., device 1, device 2, device 3, device 4), although any suitable number of devices may be associated with a user account.

State information record 200 may include device data 202 that includes any suitable number of device attributes (e.g., device data attributes 203) corresponding to the devices with which the user account is associated. Device attributes may include, but are not limited to, device identifiers, serial numbers, device capabilities, device components, or any suitable data that describes any suitable aspect and/or identification of the device and/or its capabilities.

State information record 200 may include group data 204. Group data 204 may include group data attributes 205. Group data attributes 205 may include one or more group identifiers that in turn are associated with one or more device identifiers. By way of example, a group identifier "downstairs" may be an identifier that is associated with a device group including device 1 and device 2. Group data 204 may be user defined or otherwise assigned. In some embodiments, command provided by group identifier (e.g., "play song A downstairs") may be applied to every device associated with the group identifier (e.g., device 1 and device 2 based on their association to the group "downstairs").

State information record 200 may include filtering data 206 which in turn may include filtering data attributes 207. Filtering data attributes 207 may include any suitable data with which content is filtered (e.g., restricted or allowed). As a non-limiting example, filtering attributes 207 may include data that indicates a particular device (e.g., device 1) is not allowed to play explicit content (e.g., content associated with a label that indicates the content includes adult language).

State information record 200 may include subscription data 208 which in turn may include subscription data attribute(s) 209. Subscription data attribute(s) 209 may include any suitable data related to a subscription. By way of example, subscription data attribute(s) 209 may indicate, for each subscription associated with the user account, a subscription type, rules, restrictions, benefits, rights, licenses, or the like. In some embodiments, decisions regarding what content can be played at any given device may depend on one or more attributes of the subscription data attribute(s) 209.

State information record 200 may include device history 210. A historical record of actions or operations performed at or by a device may be maintained for every device associated with a user account. For example, device 1, 2, 3, and 4 may individually be associated with historical data 1, 2, 3, and 4, respectively. Historical data 1, 2, 3, and 4 may include any suitable data that describes the actions and/or operations performed at or by a user device. In some embodiments, each historical data record (e.g., historical data 1) may correspond to a predefined time period (e.g., the last 24 hours, the last month, the last hour, etc.) or number of actions (e.g., the last 100 actions performed at the device, operations corresponding to the last 5 user commands, etc.)

Figure 3:
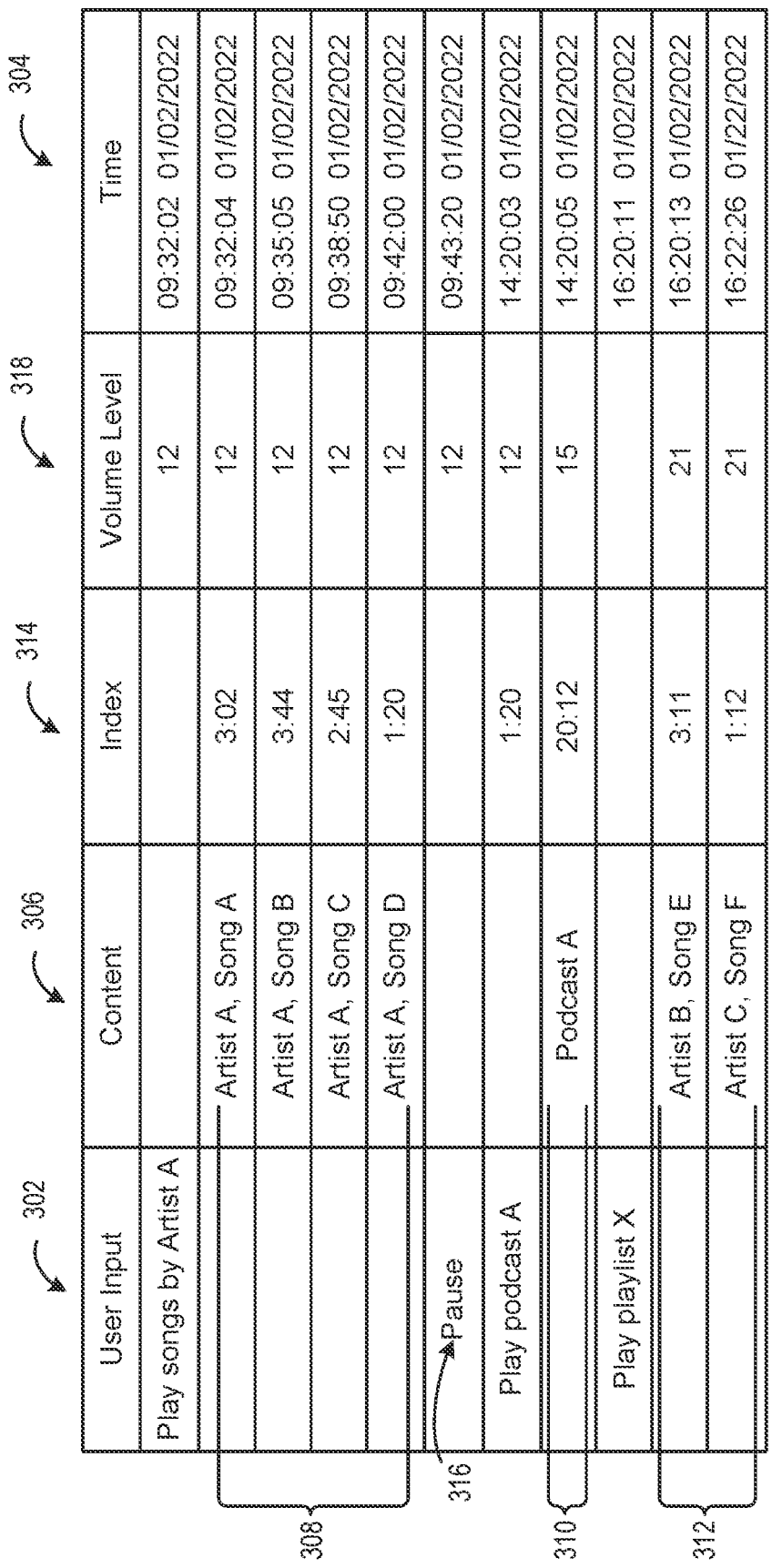
FIG. 3 is a schematic diagram illustrating an example of historical data record associated with playback of content at one device, in accordance with at least one embodiment.

FIG. 3 is a schematic diagram illustrating an example of historical data record 300 associated with playback of content at one device (e.g., user device 106A of FIG. 1, which is an example of device 1 of FIG. 2, etc.), in accordance with at least one embodiment. In some embodiments, the historical data record 300 may be associated with a particular device or a group of devices (e.g., devices associated with the group identifier "downstairs," etc.). As a non-limiting example, historical data record 300 may include any suitable data corresponding to any suitable number of user inputs (e.g., vocal input (e.g., commands) received by the user device 106A, touch input received at the user device 106A, etc.) and/or any suitable number of operations performed at the user device 106A. As an example, historical data record 300 may store data related to user input as any suitable historical data related to the last 24 hours. The historical data record 300 may indicate, as depicted in FIG. 3, that three instances of user input (in this case, vocal commands) were received (e.g., play songs by artist A, play podcast A, and play playlist X). Entries corresponding to user input may be depicted in column 302. Each entry in the historical data record 300 may be timestamped as depicted in column 304. The timestamp for an entry may be a date and/or a time at which the user input or operation was initiated at the user device (e.g., user device 106A).

In some embodiments, the historical data record 300 may include any suitable number of identifiers corresponding to content presented at the user device. For example, the historical data record 300 may include identifiers of content presented at the user device. Column 306 depicts this data. In some embodiments, the content identifiers for content presented in response to a particular instance of user input may be identified. By way of example, column 302 may indicate a user input of "play songs by artist A" and content identifiers 308 may include content identifiers for songs A, B, C, and D, each of which were played in response to the command "play songs by artist A." In some embodiments, the historical data record 300 may otherwise maintain an association between a user's input and one or more operations (e.g., playback of content instances) that occurred due to processing the user's input. As depicted in FIG. 3, the user input "play podcast A" may be associated with the playback of podcast A as depicted at 310. Similarly, the input "play playlist X" may be associated with playback of songs E and F as depicted at 312.

In some embodiments, the historical data record 300 may include an index as for each instance of content playback as depicted in column 314. In some embodiments, an index may identify a last position reached in playback. By way of example, an index may be a run time, a scene identifier, or the like that indicates a position within playback of the content that was last reached. By way of example, song D may have a total playback time (total run time) of three minutes and twelve seconds. However, due to the user input received at 09:43:20 as depicted at 316, song D may have been halted one minute and twenty seconds into the song. An index indicating the current position (e.g., 1:20) may be stored such that the last point reached in the song may be stored for subsequent use.

The historical data record 300 may include any suitable data related to any suitable aspect of user input and/or operations performed at the user device. Column 318 depicts maintaining a record of the volume levels at which content was played. Any suitable information stored in the historical data record 300 and/or the state information record 200 of FIG. 2 may be utilized by the content management engine 102 at any suitable time for any suitable purpose (e.g., to make decisions regarding what content is to be played and/or which device(s) are to be used for playback).

Returning to FIG. 1, the state information may be maintained in the manner and/or records described in connection with FIGS. 2 and 3 or otherwise. In some embodiments, the state information 114 may be stored as objects, lists, files, or the like and may be specific to the device, a group of devices, or user account.

At 116, content may be played at a first user device. By way of example, the user 110 may provide user input 116 (e.g., vocal input including "play playlist X"). The user input 116 may be received by user device 106A. The user input 116 or any suitable data related to the user input 116 may be transmitted to the content management engine 102. In some embodiments, the user input 116 may be converted (e.g., from voice to text) and/or augmented (e.g., associated with a time stamp, associated with a textual version of the input, etc.) by the user device 106A and/or by any suitable device or computing component (e.g., routing service) before being received by the content management engine 102 (operating as part of content provider computer(s) 104). Content management engine 102 may determine from state information 114 that the user input 116 does not relate to any historically played content and/or any past user input. That is, that the playlist X has not already been played elsewhere within a given time period (e.g., since initialization of the user device 106A, in the last day, month, year, etc.). In accordance with this determination, the content management engine 102 may transmit a request to play playlist X at device 106A to service provider computer(s) 108. Service provider computer(s) may then begin playback at user device 106A of a set of songs associated with playlist X.

At 118, while the content is still being played at the user device 106A or after the content is paused or otherwise halted, the user 110 may provide additional user input (e.g., user input 118, "Resume," etc.) at another device (e.g., user device 106C). This device may be located some distance away from the user device 106A (e.g., in another room at the user's home, etc.). Once again, the user input 118 (and all input received at any user device, at any time) may be converted (e.g., from voice to text) and/or augmented (e.g., associated with a time stamp, associated with a textual version of the input, etc.) by the user device 106C and/or by any suitable device or computing component (e.g., routing service) before being received by the content management engine 102 (operating as part of content provider computer(s) 104).

At 120, content and/or one or more playback devices may be identified by the content management engine 102). For example, content management engine 102 may determine from state information 114 whether the user input 118 relates to historically played content and/or any past user input. For example, the content management engine 102 may determine that the user input indicates a relation to historically played content but does not reference the content specifically. In some embodiments, this determination may be made based at least in part on a comparison performed between the user input (or textual representation of the user input) and a predefined set of words and/or phrases). The content management engine 102 may identify from the state information 114, the last content played on any user device associated with the user account. In the scenario in which the playlist X was still being played at 106A and/or no other content had been played at a user device since playlist X was playing, the content management engine 102 may determine playlist X (and, potentially, a song of playlist X) that was last played. In some embodiments, the content management engine 102 may determine an index (e.g., a run time such as one minute, twenty seconds that was last reached during playback).

At 122, the content management engine 102 may then transmit a request to service provider computer(s) 108 to play playlist X (the user input associated with playback of the last content played), with additional information obtained from state information 114 that indicates the song and/or run time last reached during the last playback, and the device at which playback is to be performed (in this case, user device 106C). Any suitable portion of the state information 114 that relates to the playback of the last content played and/or information regarding how subsequent playback is to occur may be transmitted in the request. In some embodiments, service provider computer(s) 108 may use the user input "play playlist X" received in the request to identify a set of songs (e.g., songs of the playlist X) to play at the user device 106C. Utilizing the state information or other data received in the request, the service provider computer(s) 108 may cause playback to begin on the last song played and at the last run time reached in that song. To the user, these operations may appear as if the playback of the content moved from the first user device (e.g., user device 106A) to a second user device (e.g., user device 106C).

This movement of content between devices may occur in a variety of ways. In this example, the movement was from one device to another, but similar techniques may be utilized to move from one device to two or more devices (e.g., a group of devices), or from a group of devices to one device, or from one group of devices to another group of devices. In any of these scenarios, state information may be identified and utilized to determine what content to be played, what device(s) are to be used for playback, whether playback of that content is allowed at those devices, and the like. Additionally, although the example provided in FIG. 1 initiated the move from another device and the device from which playback was then requested, it should be appreciated that a request to move playback may be initiated from the currently playing device, or another device altogether. Additional examples of this are discussed below in connection with FIGS. 4 and 5.

Figure 4:
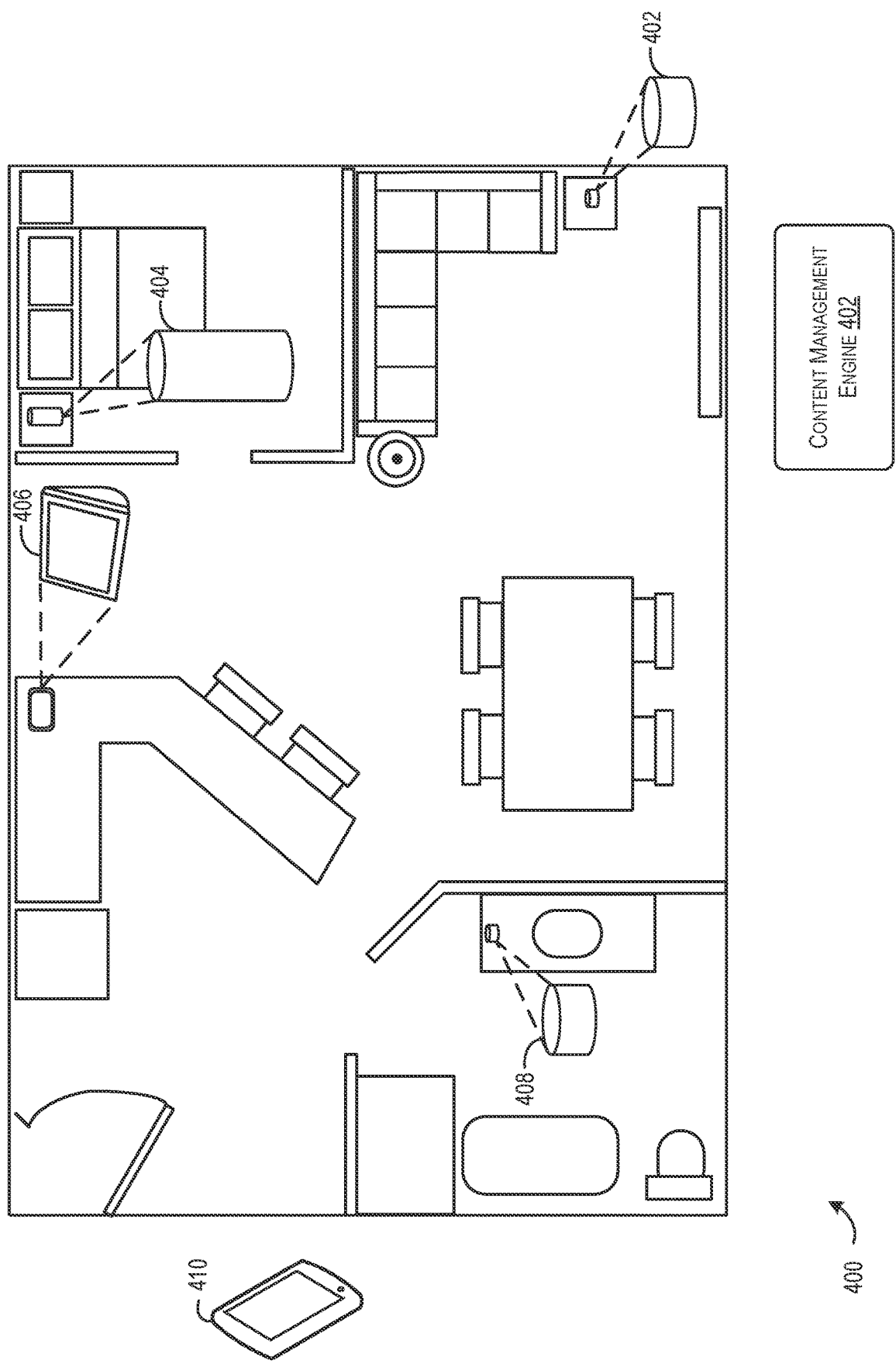
FIG. 4 is a schematic diagram illustrating an environment and exemplary techniques for modifying playback of content, in accordance with at least one embodiment.

FIG. 4 is a schematic diagram illustrating an environment 400 and exemplary techniques for modifying playback of content, in accordance with at least one embodiment. Environment 400 is intended to depict a user's home. User devices 402, 404, 406, 408, and 410 are intended to be examples of the user device 106 of FIG. 1. Each of the user devices 402-410 are associated with a user account (e.g., a user profile) corresponding to the user. In some embodiments, user devices 402 and 406 are associated with a group (e.g., a group associated with an identifier such as "party time"). The devices 402-410 may be in communication with one another and/or the content management engine 402 (an example of the content management engine 102 of FIG. 1) via any suitable network (not depicted). User device 402-408 are intended to depict wired devices that remain stationary unless moved by the user. User device 410 is intended to depict a mobile device (e.g., a mobile phone although other wireless devices are contemplated such as ear buds). The user devices 402-410 may be any suitable user device configured to receive of receiving user input and of presenting (e.g., via a speaker and/or display) content (e.g., music, audio books, videos, etc.).

Figure 5:
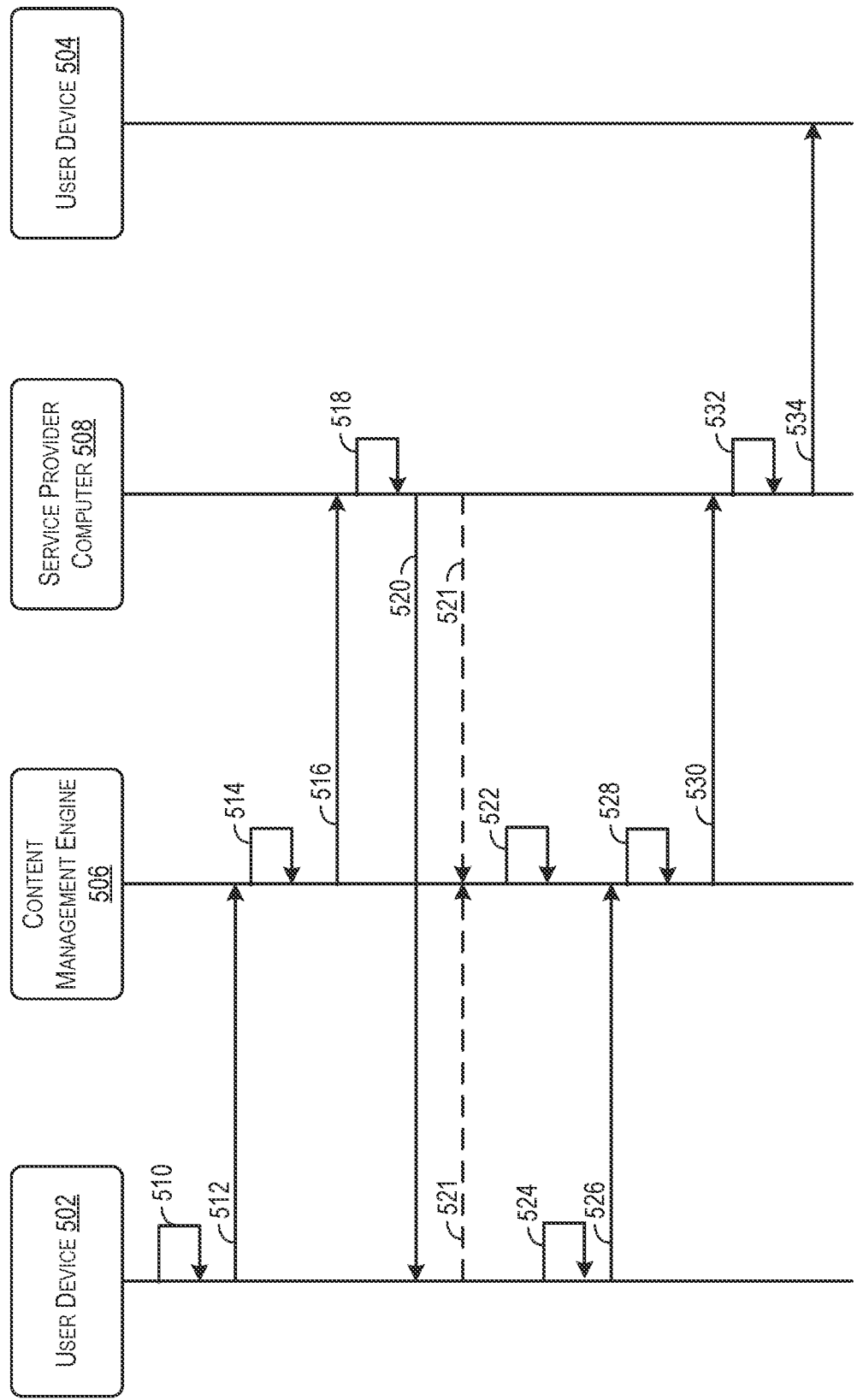
FIG. 5 illustrates a flow illustrating an example method for modifying content playback from playing at one device to playing at another device, in accordance with at least one embodiment.

FIG. 5 illustrates a flow illustrating an example method 500 for modifying content playback from playing at one device to playing at another device, in accordance with at least one embodiment.

In some embodiments, user device 502 may be an example of user device 404 of FIG. 4. As an example, user device 404 may be an example of a smart speaker. For exemplary purposes, the user device 504 may be an example of the user device 406 of FIG. 4, that may be an example of a smart speaker that is configured with a display. Content management engine 506 may be an example of the content management engine 102 operating as part of content management computer(s) 104 of FIG. 1, while service provider computer 508 may be an example of the service provider computer(s) 108 of FIG. 1. The content management engine 506 may be configured to maintain state information (e.g., state information record 200 of FIG. 2, including a historical information record (e.g., historical information record 300 of FIG. 3)) corresponding to any suitable combination of the user devices associated with a given user account (e.g., a user profile). In the example provided in FIG. 5, the user devices 502 and 504 may be associated with the same user account (in addition to the user devices 402, 408, and 410 of FIG. 4).

The method 500 may begin at 510, where the user device 502 may receive user input. By way of example, a user (not depicted), standing within a threshold distance of user device 502 may provide vocal input which may be received at a microphone of user device 502. The vocal input may include a wake word and/or phrase that is recognizable by the user device 502 as indicating additional input is about to be provided. The user device 502 may capture audio via the microphone including the wake word/phrase and any subsequent utterance. By way of example, the user may state aloud "[wake phrase] play songs by [Artist A]," where [Artist A] is the name of a particular music artist.

At 512, a request may be transmitted to content management engine 506. The request may include, among other things, the user input and/or any suitable data corresponding to the user input may be transmitted. The user input may include audio captured by the microphone of user device 502. In some embodiments, the request may be received by a routing service (from the user device 502 (or a different intermediate computing component) and processed before being routed to content management engine 506. Any potential intervening component(s) that provide any suitable processing before the request is received by the content management engine 506 may be referred to as "an intermediate computing component(s)." The user device 502 and/or the intermediate computing component(s) may be configured to convert the user input to a different format (e.g., a textual representation of an audible input) and/or to augment the user input. For example, a time stamp indicating a day and/or time at which the user input was received may be added to the request prior to transmission. A device identifier identifying user device 502 may be included in the request. The input "[wake phrase] play songs by [Artist A]," may be modified in some examples to strip the wake word/phrase from the audio and/or a textual representation. Thus, the request transmitted to (or received by) content management engine 506 may include input such as "play songs by [Artist A]."

At 514, the content management engine 506 may receive and process the request including the audible input and/or a textual representation of the audible input. Both will be referred to as "the command" for brevity. As part of the processing of the request, the content management engine 506 may identify whether the command relates to a previously received command. If the command does not relate to a previous command, the content management engine 506 may forward the request to the service provider computer 508. Alternatively, if the command does relate to a previous command, the content management engine 506 may identify particular content related to the command and/or user devices related to the command based at least in part on the state information for the user account. By way of example, the command "play songs by [Artist A]" may be used with the state information to determine that the command does not relate previously received input and/or previously played content. In this example, content management engine 506 may utilize a predefined rule set to identify that the phrase "plays songs" indicates a new command that does not relate to previous inputs and/or previously played content. In some embodiments, the content management engine 506 may determine that the command does not relate to previously played content by identifying that the state information does not include any indication that content associated with Artist A has previously been requested and/or presented at any of the user devices associated with the user account (at least for the period of time to which the state information relates).

At 516, after determining that the command does not relate to previous commands and/or previously presented content, the content management engine 506 may forward the request to the service provider computer 508. The request transmitted to the service provider computer 508 may be unaltered by the content management engine 506 or the request may be altered to include any suitable portion of the state information record maintained by the content management engine 506.

At 518, the service provider computer 508 may receive and process the request. In the ongoing example, the command "play songs by [Artist A]" may be processed by the service provider computer 508. The service provider computer 508 may be configured to perform a query against a content corpus to identify one or more songs associated with an Artist that is associated with an identifier corresponding to "Artist A." Based on the request (e.g., a device identifier indicating the command was received at user device 502), the service provider computer 508 may identify that the one or more songs are to be presented at user device 502.

At 520, the service provider computer 508 may execute operations to cause user device 502 to begin presented the one or more songs identified at 518. By way of example, the service provider computer 508 may begin streaming the one or more songs to user device 502. The user device 502 may be configured to receive and present the data (e.g., play the songs via a speaker of the user device 502).

While the content (e.g., the one or more songs identified at 518) is being streamed and/or presented at the user device 502, state information may be provided by the service provider computer 508 and/or the user device 502 at 521. This state information may be provided intermittently, periodically, in real time, or the like. The state information may identify any suitable aspect of the playback occurring at the user device 502. By way of example, at 521 the service provider computer 508 and/or the user device 502 may provide state information to the content management engine 506 indicating a last run time reached at and/or provided to the user device 502. In some embodiments, this state information may be provided in response only to change (e.g., when the content is paused or otherwise halted, when the user device 502 transitions from one song to another, when new user input is provided, or the like). At 522, the content management engine 506 may store the state information received in the state information record 200 (that includes the historical information record 300 corresponding to the user device 502).

While the content (e.g., the one or more songs identified at 518) is being streamed and/or presented at the user device 502, additional user input may be received at the user device 502 at 524. By way of example, the user may state "[wake phrase] play this in the Kitchen." The user input may be processed by the user device and/or an intermediate computing component in a similar manner as described above before transmitting a request to the content management engine 506 at 526.

At 528, the content management engine 506 may identify "play this" as a phrase that indicates the request pertains to a past request and/or previously played content. In this example, the content management engine 506 may be configured to identify from the state information record 200 that the command in the request refers to a previous command (e.g., "play songs by Artist A"). The content management engine 506 may identify the current song being played is at a run time of one minute and twenty seconds. The content management engine 506 may further identify from the state information that a second user device (e.g., user device 504) is associated with a device identifier (or a group identifier) of "Kitchen." The content management engine 506 may include any or all information received in the request along with any suitable state information obtained from the state information record 200 (e.g., the device identifier corresponding to "Kitchen", any suitable information regarding playback of the one or more songs such as the identifier and current run time for the song currently being played, etc.). In some embodiments the content management engine 506 may include the previous command to which the current command relates or it may replace the current command with the previous command. For example, the content management engine 506 may provide data that instructs the service provider computer 508 to perform the query "songs by Artist A" once more, to play it at user device 504, and to start at song x (the last song that was played at user device 502), starting at a run time corresponding to the last run time stored by the content management engine 506 for that song in state information record 200.

At 530, the content management engine 506 may transmit a request to the service provider computer 508.

At 532, the service provider computer 508 may receive and process the request. In the ongoing example, the service provider computer 508 may perform the query "songs by Artist A" to obtain the one or more songs associated with Artist A, and to start at song x (the last song that was played at user device 502), starting at a run time provided in the request.

At 534, the service provider computer 508 may execute operations to begin streaming the one or more songs to user device 504 starting at the current song and run time requested. The user device 504 may be configured to receive and present the data (e.g., play the songs via a speaker of the user device 504). It should be noted that service provider computer 508 could send data to the user device 502 to halt playback, or the user device 502 may be configured to halt playback upon receiving the user input "play this in the Kitchen."

Utilizing the techniques discussed in connection with FIG. 5, the user may "push" content from one device to another by providing a command to a user device that was already playing content. Similar techniques could be used to push the content playback to multiple other devices. For example, the user could have said "play this at party time" where "party time" is associated with user device 504 and another user device (e.g., user device 402 of FIG. 4). In this scenario, similar operations can be performed by the content management engine 506 to identify both devices as being associated with a group identifier of "party time," and therefore the instructions sent to service provider computer 508 may cause the service provider computer 508 to begin playing the last song at the request run time at both user device 504 and user device 402.

Figure 6:
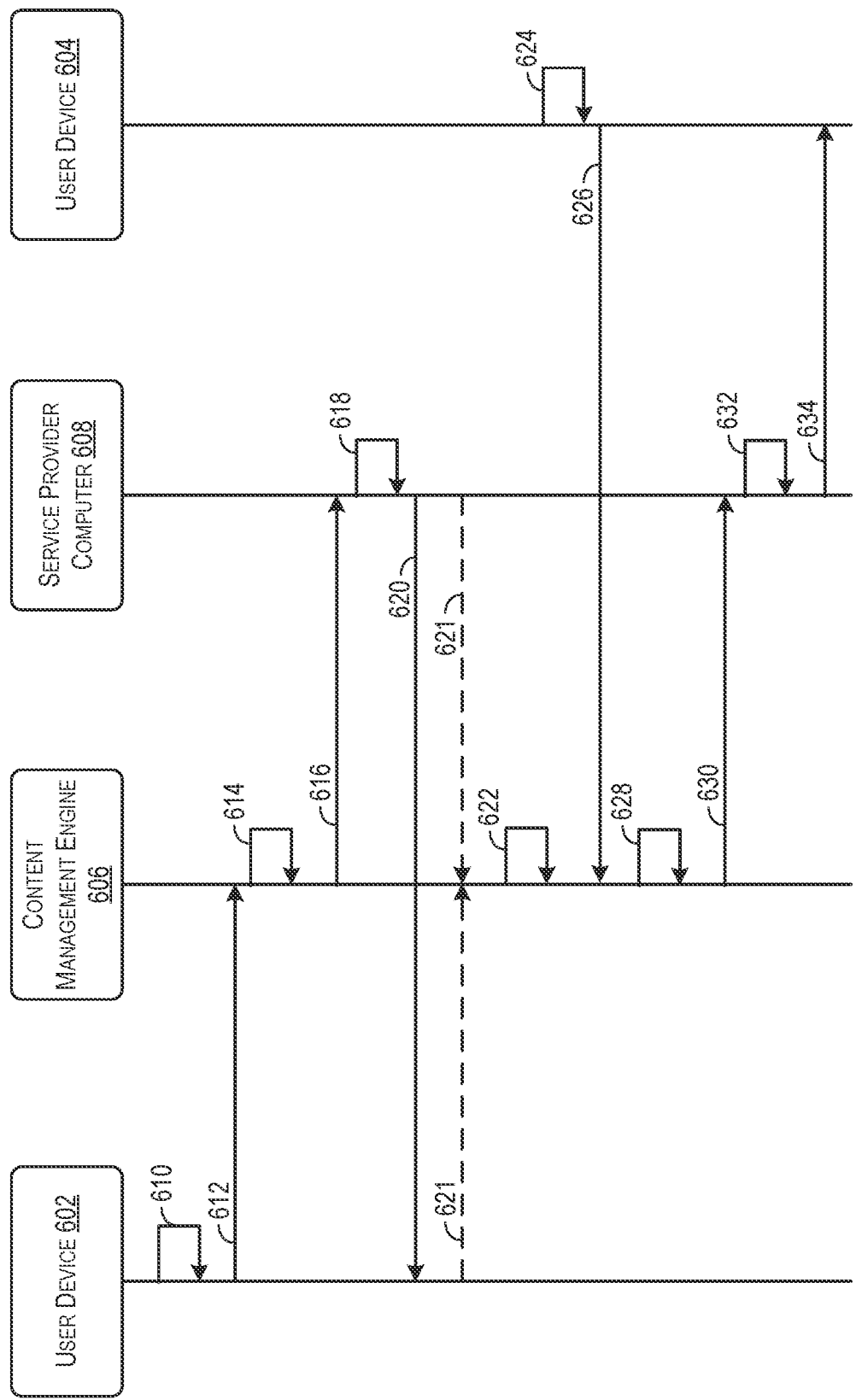
FIG. 6 illustrates a flow illustrating another example method for modifying content playback from playing at one device to playing at another device, in accordance with at least one embodiment.

FIG. 6 illustrates a flow illustrating another example method 600 for modifying content playback from playing at one device to playing at another device, in accordance with at least one embodiment.

In some embodiments, user device 602 may be an example of user device 408 of FIG. 4. As an example, user device 408 may be an example of a smart speaker. For exemplary purposes, the user device 604 may be an example of the user device 410 of FIG. 4, that may be an example of a smart phone that is configured with a display and a communications antenna that enables the user device to receive data over-the-air such as from a wireless network and/or a cellular network. Content management engine 606 may be an example of the content management engine 102 operating as part of content management computer(s) 104 of FIG. 1, while service provider computer 608 may be an example of the service provider computer(s) 108 of FIG. 1. The content management engine 606 may be configured to maintain state information (e.g., state information record 200 of FIG. 2, including a historical information record (e.g., historical information record 300 of FIG. 3)) corresponding to any suitable combination of the user devices associated with a given user account (e.g., a user profile). In the example provided in FIG. 6, the user devices 602 and 604 may be associated with the same user account (in addition to the user devices 402, 404, and 406 of FIG. 4).

The method 600 may begin at 610, where the user device 602 may receive user input. The operations performed at 610-620 may generally correspond to the operations performed at 510-520 of the example provided in connection with FIG. 5. As a non-limiting example, the command provided at 610 may be "[wake phrase] play playlist X" where "playlist X" refers to a previously defined playlist (e.g., a user defined playlist associated with an identifier "X").

At 620, the service provider computer 608 may execute operations to cause songs associated with the playlist X (as identified at 618) to begin playback at user device 602. By way of example, the service provider computer 608 may begin streaming the one or more songs of playlist X to user device 602. The user device 602 may be configured to receive and present the data (e.g., play the songs via a speaker of the user device 602).

While the content is being streamed and/or presented at the user device 602, state information may be provided by the service provider computer 608 and/or the user device 602 at 621. As described above, the state information may be provided intermittently, periodically, in real time, or the like. The state information may identify any suitable aspect of the playback occurring at the user device 602. At 622, the content management engine 506 may store the state information received in the state information record 200 (that includes the historical information record 300 corresponding to the user device 602).

While the content is being streamed and/or presented at the user device 602, or even after the content is halted (e.g., via a command associated with pausing or otherwise halting the content playback), additional user input may be received at the user device 604 at 624. By way of example, the user may state "[wake phrase] play my music here." The user input may be processed by the user device and/or an intermediate computing component in a similar manner as described above before transmitting a request to the content management engine 606 at 626.

At 628, the content management engine 606 may identify (e.g., based on a predefined list of command/phrases) "play my music" as a phrase that indicates the request pertains to a past request and/or previously played content. In this example, the content management engine 606 may be configured to identify from the state information record 200 that the command in the request refers to a previous command (e.g., "play playlist X"). The content management engine 606 may be configured to associate the command "play my music" with the previous command "play playlist X" based on identifying that "music" is associated with content of a particular type (e.g., music) and that playlist X of the previous command is also associated with content of that type. This identification is possible even though the command "play my music here" is received at a different device from the one originally used for playback (e.g., user device 602).

The content management engine 606 may be configured to identify the playlist X as the associated command even if playing that playlist was not associated with the last content-based command. For example, if the user had commanded "play playlist X" and then later commanded (from any device) "play podcast B," and then even later commanded (at user device 604) "play my music here," the content management engine 606 may identify the command "play my music here" as relating to the command "play playlist X" as "play playlist X" and "play my music here" are commands associated with a content type of "music," while the command "play podcast B" is associated with a content type of "podcast." Although not depicted in the records 200 or 300 of FIGS. 2 and 3, respectively, the content type of each instance of content may also be stored in the state information maintained by the content management engine 602. The content management engine 602 may identify the last song played from the playlist reached at a run time of two minutes and thirty seconds. The content management engine 606 may further identify that the term "here" indicates the device at which the command was received (in this case user device 604). The content management engine 606 may include any or all information received in the request along with any suitable state information obtained from the state information record 200. In some embodiments the content management engine 606 may include the previous command to which the current command relates (e.g., "play playlist X")

or it may replace the current command with the previous command. For example, the content management engine 606 may provide data that instructs the service provider computer 608 to perform the query "play playlist X" once more, to play it at user device 604, and to start at song x (the last song that was played at user device 602), starting at a run time corresponding to the last run time stored by the content management engine 606 for that song in state information record 200.

At 630, the content management engine 606 may transmit a request to the service provider computer 608.

At 632, the service provider computer 608 may receive and process the request. In the ongoing example, the service provider computer 608 may perform the query "playlist X" to obtain the one or more songs associated with that playlist, and to start at song x (the last song of the playlist that was played at user device 602), starting at a run time provided in the request.

At 634, the service provider computer 608 may execute operations to begin streaming the one or more songs to user device 604 starting at the current song and run time requested. The user device 604 may be configured to receive and present the data (e.g., play the songs via a speaker of the user device 604). In some embodiments, the service provider computer 608 and/or content management engine 602 may be configured to send data to the user device 602 to halt playback if the user device 602 was still playing songs of the playlist at the time.

Utilizing the techniques discussed in connection with FIG. 6, the user may "pull" content from one device to another by providing a command to a user device different from the one that was already playing the requested content. Similar techniques could be used to pull the content playback to multiple devices. For example, the user could have said "play my music at [group identifier]." The content management engine 606 may identify which, if any, device identifiers corresponds to the group identifier and may include those identifiers in the request transmitted to the service provider computer 608 to effectuate playback at the devices associated with that group identifier.

Any suitable portion of the state information may be utilized to identify whether content can be pushed or pulled to or from a device. By way of example, some devices may be associated with filtering data that indicates they are not allowed to play explicit content. The content management engine may be configured to identify from the filtering data (of the state information record 200) whether the move is allowed. A request to move explicit content from a device at which it is allowed, to a device at which explicit content playback is not allowed, may be rejected (e.g., by the content management engine). In a similar vein, content may be associated with particular digital rights and/or one or more subscription type(s). Some of these rights/subscriptions may specify how many devices and/or specific device(s) at which playback is allowed. A request to move content from a device at which playback is allowed according to these rights/subscriptions to a device that is not allowed can be rejected (e.g., by the content management engine). By way of example, a subscription type of "individual" may allow playback at only one device while a "family" subscription type may allow playback at up to six devices. Thus, a request to move content playable at one device based on an "individual" subscription to another device may be rejected by the content management engine.

Figure 7:
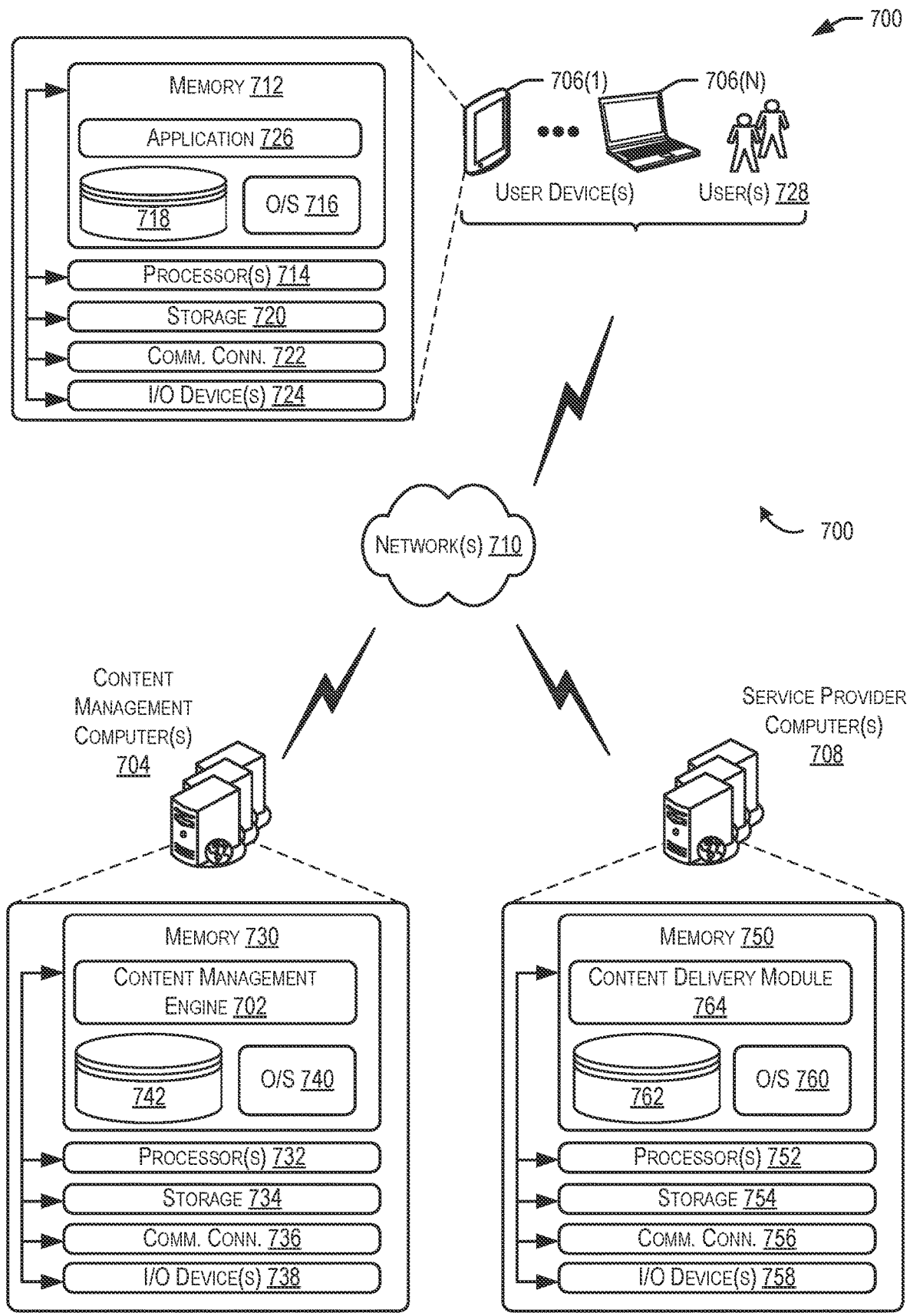
FIG. 7 is an example system for implementing aspects of the content management engine, in accordance with at least one embodiment.

FIG. 7 is an example system 700 for implementing aspects of the content management engine 702 (e.g., the content management engine 102 of FIG. 1), in accordance with at least one embodiment. The system 700 may include one or more content provider computer(s) 704 (e.g., the content provider computer(s) 102 of FIG. 1), user device(s) 706(1)-706(N) (collectively referred to as "user device(s) 706"), and/or one or more service provider computer(s) 708. The user device(s) 706 are each intended to be an example of the user device 106 of FIG. 1. Although content management engine 702 is depicted as operating at a content management computer 704 it should be appreciated that all, or some portion, of the content management engine 704 may execute at the service provider computer(s) 708.

The content management computer(s) 704, user device(s) 706, and service provider computer(s) 708 may be in communication with one another via one or more network(s) 710. In some examples, the network(s) 710 may include any one or a combination of many different types of networks, such as cable networks, the Internet, wireless networks, cellular networks, and other private and/or public networks.

The user device(s) 706 (e.g., the user devices 106 of FIG. 1) may be any suitable type of computing device such as, but not limited to, a smartphone, a smart speaker, a smart watch, a personal digital assistant (PDA), a laptop computer, a desktop computer, a thin-user device, a tablet PC, a television, an electronic book (e-book) reader, or any suitable device configured to present digital content.

In one illustrative configuration, the user device(s) 706 may include at least one memory 712 and one or more processing units (or processor(s) 714). The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described.

The memory 712 may store program instructions that are loadable and executable on the processor(s) 714, as well as data generated during the execution of these programs. The memory 712 may include an operating system 716, one or more data stores 718, and/or one or more application programs, modules, or services for implementing the features disclosed herein including one or more features of the content management engine 702. Depending on the configuration and type of user device, the memory 712 may be volatile (such as random access memory (RAM)) and/or non-volatile (such as read-only memory (ROM), flash memory, etc.). The user device(s) 706 may also include additional removable storage and/or non-removable storage (e.g., storage 720) including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 712 may include multiple different types of memory, such as static random access memory (SRAM), dynamic random access memory (DRAM), or ROM.

The memory 712 and storage 720, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. Additional types of computer storage media that may be present in the user device(s) 706 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device(s) 706 may also contain communications connection(s) 722. The communication connection(s) 722 may allow the user device(s) 706 to communicate with a stored database, another computing device or server, and/or other devices on the network(s) 710. The user device(s) 706 may also include I/O device(s) 724. The I/O device(s) 724 may include devices such as a keyboard, a mouse, a pen, a voice input device, a touch input device, a display, speakers, a printer, etc.

Application 726 may execute at the user device(s) 706. Application 726 may be configured to communicate with the content management computer(s) 704 and service provider computer(s) 708. The application 726 may include a virtual assistant (e.g., a software agent) that is configured to perform tasks or services for the user based on commands or questions. The application 726 may be configured to allow the user(s) 728, among other things, to play digital content provided by the service provider computer(s) 708. The application 726 may also be in communication with the content management engine 702. In some embodiments, the application 726 may communicate to the service provider computer(s) 708 directly, and/or via the content management computer(s) 704. Although not depicted, information provided between the content management computer(s) 704 and the user device(s) 706 may be communicated between one or more other systems. By way of example only, another service (not depicted) may be configured to receive input provided at the user device(s) 706 and transmit that input (or information related to the input) to the content management computer(s) 704 via network(s) 710. In some embodiments, this service may be configured to process the input from user device(s) 706 to make routing choices. For example, the input may pertain to a variety of functionality, while the content management computer(s) 704 may be configured to provide functionality related to content (e.g., music, videos, podcasts, etc.). The service may receive the input and determine the input relates to particular content (or a content type) that is associated with the content management computer(s) 704. Upon making this determination, the service may route the any suitable portion of the input (or data generated from the input) to the content management computer(s) 704 for further processing.

In some examples, the content management computer(s) 704, are perhaps arranged in a cluster of servers or as a server farm, may host the application 726 and/or cloud-based software services. Other server architectures may also be used to host the application 726 (and/or content management engine 702) and/or cloud-based software services. The application 726 may be capable of handling requests from the user(s) 728 and serving, in response, various user interfaces that can be rendered at the user device(s) 706. In some embodiments (e.g., when I/O device(s) 724 include a display) the application 726 can present any suitable type of website and/or graphical interface to enable the user(s) 728 to select an option to play particular digital content. In some embodiments, the application 726 may be configured to present a media stream corresponding to the selected content (e.g., via the I/O device(s) 724 of the user device(s) 706 such as a display and/or speaker).

In some aspects, the content management computer(s) 704 may be any suitable type of computing devices such as, but not limited to, a mobile phone, a smart phone, a personal digital assistant (PDA), a laptop computer, a desktop computer, a server computer, a thin-user device, a tablet PC, etc. Additionally, it should be noted that in some embodiments, the content management computer(s) 704 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. The content management computer(s) 704 may individually include one or more servers, perhaps arranged in a cluster, as a server farm, or as individual servers not associated with one another. These servers may be configured to implement the techniques described herein as part of an integrated computing environment.

In one illustrative configuration, the content management computer(s) 704 may include at least one memory 730 and one or more processing units (or processor(s) 732). The processor(s) 732 may be implemented as appropriate in hardware, computer-executable instructions, firmware, or combinations thereof. Computer-executable instruction or firmware implementations of the processor(s) 732 may include computer-executable or machine-executable instructions written in any suitable programming language to perform the various functions described.

The memory 730 may store program instructions that are loadable and executable on the processor(s) 732, as well as data generated during the execution of these programs. Depending on the configuration and type of service provided by the content management computer(s) 704, the memory 730 may be volatile (such as RAM) and/or non-volatile (such as ROM, flash memory, etc.). The content management computer(s) 704 may also include additional storage 734, which may include removable storage and/or non-removable storage. The storage 734 may include, but are not limited to, magnetic storage, optical disks and/or tape storage. The disk drives and their associated computer-readable media may provide non-volatile storage of computer-readable instructions, data structures, program modules, and other data. In some implementations, the memory 730 may include multiple different types of memory, such as SRAM, DRAM, or ROM.

The memory 730 and/or the storage 734, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 730 and the storage 734 are examples of computer storage media. Additional types of computer storage media that may be present in the content management computer(s) 704 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The content management computer(s) 704 may also contain communication connection(s) 736. The communication connection(s) 736 may allow the content management computer(s) 704 to communicate with a stored database, another computing device or server, user terminals and/or other devices on the network(s) 710. The content management computer(s) 704 may also include I/O device(s) 738. The I/O device(s) 738 may include devices such as a keyboard, a mouse, a pen, a voice input device, a touch input device, a display, speakers, a printer, etc.

Turning to the contents of the memory 730, the memory 730 may include an operating system 740, one or more data stores 742, and/or one or more application programs, modules, or services such as a content management engine 744. The content management engine 744 may be configured to manage state information regarding playback of various content at the device(s) 706. In some embodiments, the content management engine 744 may be configured to identify/determine particular content and/or one or more devices to which that content is to be streamed. These determinations may be performed by the content management engine 744 based at least in part on the state information maintained by the content management engine 744. In some embodiments, the content management engine 744 may be configured to manage a user profile (e.g., for one or more users) and/or the state information related to a user profile (e.g., when the user profile is managed by another system not depicted in FIG. 7). If the user profile(s) are managed by another system not depicted in FIG. 7, the content management engine 702 may be configured to transmit and/or receive data to/from this system (or systems) via network(s) 710 in order to exchange any suitable information (e.g., any suitable data maintained by that system such as user profile data, state information regarding playback of content at one or more user devices associated with a given user profile, subscription information, device attributes, filtering data, group data, etc.). In some embodiments, the content management engine 702 may be configured to receive and/or request data from the user device(s) 706 and/or the service provider computer(s) via network(s) 710.

In some examples, the service provider computer(s) 708 (e.g., each an example of the service provider computer(s) 104 of FIG. 1), are perhaps arranged in a cluster of servers or as a server farm, may host the application 726 and/or cloud-based software services. In some aspects, the service provider computer(s) 708 may be any suitable type of computing devices such as, but not limited to, a mobile phone, a smart phone, a personal digital assistant (PDA), a laptop computer, a desktop computer, a server computer, a thin-user device, a tablet PC, etc. Additionally, it should be noted that in some embodiments, the service provider computer(s) 708 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. The service provider computer(s) 708 may individually include one or more servers, perhaps arranged in a cluster, as a server farm, or as individual servers not associated with one another. These servers may be configured to implement the techniques described herein as part of an integrated computing environment.

In one illustrative configuration, the service provider computer(s) 708 may include at least one memory 750 and one or more processing units (or processor(s) 752). The processor(s) 752 may be implemented as appropriate in hardware, computer-executable instructions, firmware, or combinations thereof. Computer-executable instruction or firmware implementations of the processor(s) 752 may include computer-executable or machine-executable instructions written in any suitable programming language to perform the various functions described.

The memory 750 may store program instructions that are loadable and executable on the processor(s) 752, as well as data generated during the execution of these programs. Depending on the configuration and type of service provided by the content management computer(s) 704, the memory 750 may be volatile (such as RAM) and/or non-volatile (such as ROM, flash memory, etc.). The service provider computer(s) 708 may also include additional storage 754, which may include removable storage and/or non-removable storage. The storage 754 may include, but are not limited to, magnetic storage, optical disks and/or tape storage. The disk drives and their associated computer-readable media may provide non-volatile storage of computer-readable instructions, data structures, program modules, and other data. In some implementations, the memory 750 may include multiple different types of memory, such as SRAM, DRAM, or ROM.

The memory 750 and/or the storage 754, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 750 and the storage 754 are examples of computer storage media. Additional types of computer storage media that may be present in the service provider computer(s) 708 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 708 may also contain communication connection(s) 756. The communication connection(s) 756 may allow the service provider computer(s) 708 to communicate with a stored database, another computing device or server, user terminals and/or other devices on the network(s) 710. The service provider computer(s) 708 may also include I/O device(s) 758. The I/O device(s) 758 may include devices such as a keyboard, a mouse, a pen, a voice input device, a touch input device, a display, speakers, a printer, etc.

Turning to the contents of the memory 750, the memory 750 may include an operating system 760, one or more data stores 762, and/or one or more application programs, modules, or services such as a content delivery module 764. The content delivery module 764 may be configured to stream or otherwise deliver content to the user device(s) 706. In some embodiments, the content delivery module 764 may be configured to identify/determine particular content to stream to one or more devices.

Figure 8:
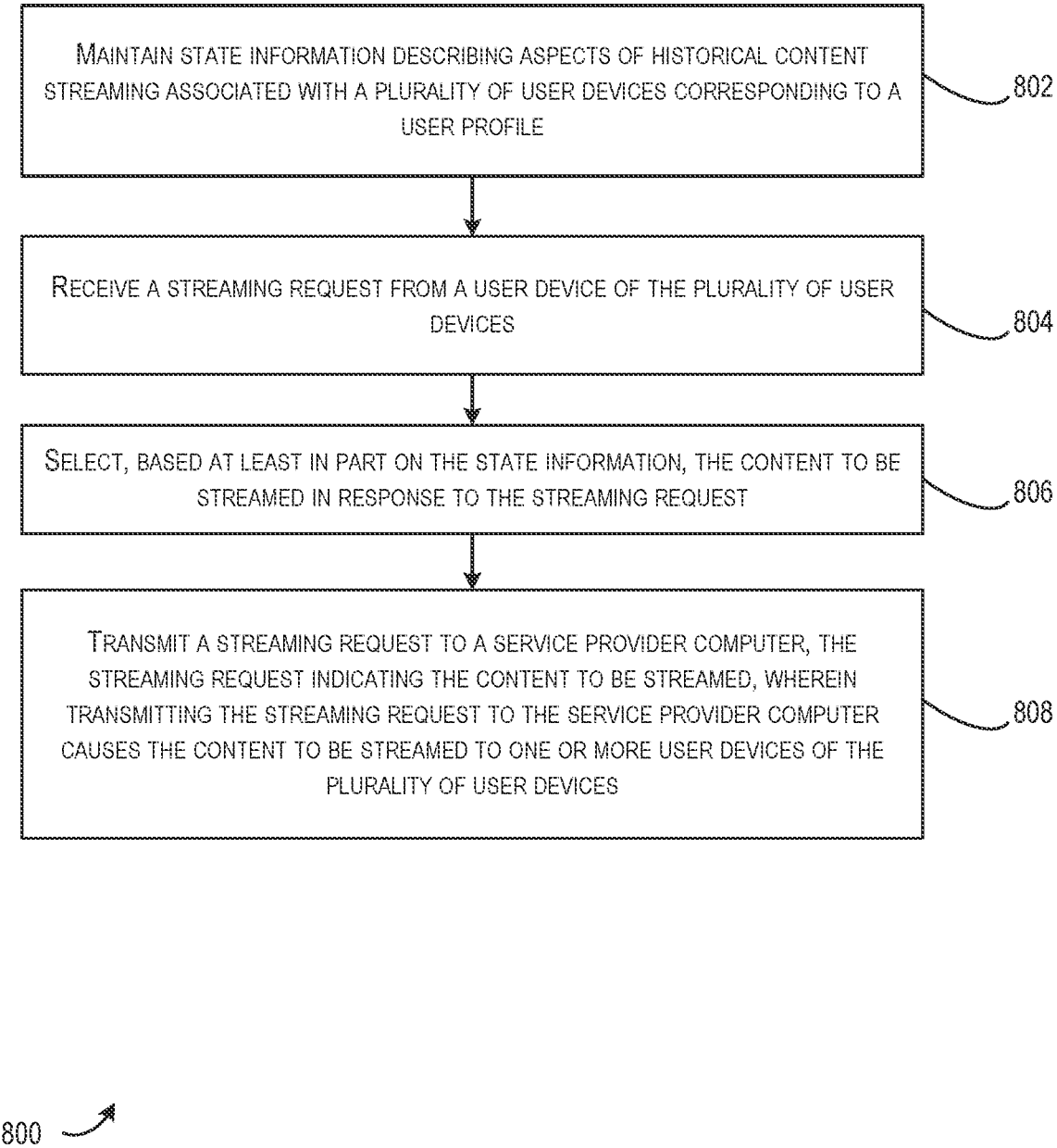
FIG. 8 is a flowchart illustrating an example method for modifying playback of content from one device to another, in accordance with at least one embodiment.

FIG. 8 is a flowchart illustrating another example method 800 for modifying content playback utilizing a content management engine (e.g., the content management engine 702 of FIG. 7), in accordance with at least one embodiment. The content management engine 702 may operate, in whole or in part, on one or more user devices (e.g., user device(s) 704) and/or at one or more content management computers (e.g., content management computer(s) 102 of FIG. 7). A computer-readable storage medium may be utilized that includes computer-readable instructions that, upon execution by one or more processors of a computing device, cause the computing device to perform the method 800. The operations discussed below with respect to method 800 may performed in any suitable order. It should be appreciated that the method 800 may include a greater number or a lesser number of operations than that depicted in FIG. 8 and described below.

The method may begin at 802, where state information (e.g., state information record 200 of FIG. 2) may be maintained (e.g., by the content management engine 702 of FIG. 7). The state information may describe aspects of historical content stream associated with a plurality of user devices corresponding to a user profile. For example, the content management engine may maintain a historical information record (e.g., the historical information record 300 of FIG. 3) for each device (e.g., user device 402-410 of FIG. 4) that describes aspects of historical content stream (e.g., the data of columns 302-306, 314, 318 of FIG. 3, content type (e.g., music, podcast, video, etc.), and/or any suitable data pertaining to content playback at a given device).

At 804, a streaming request (e.g., a request received at 512 of FIG. 5 or 612 of FIG. 6) may be received from a user device of the plurality of user devices.

At 806, content to be streamed (or otherwise presented at a user device of the plurality of user devices) may be selected by the content management engine based at least in part on state information associated with any of the plurality of user devices.

At 808, a streaming request (e.g., the data transmitted at 516 and/or 616 of FIGS. 5 and 6, respectively) may be transmitted to a service provider computer. In some embodiments, the streaming request indicates the content to be streamed. Transmitting the streaming request to the service provider computer may cause the content to be streamed to one or more user devices of the plurality of user devices. In some embodiments, the devices to be used for playback may also be identified by the content management engine at 806 and included in the streaming request transmitted at 808.

It should be appreciated that method 800 may be repeatedly performed any suitable number of times such that playback of the content may be modified as desired by the user.

Figure 9:
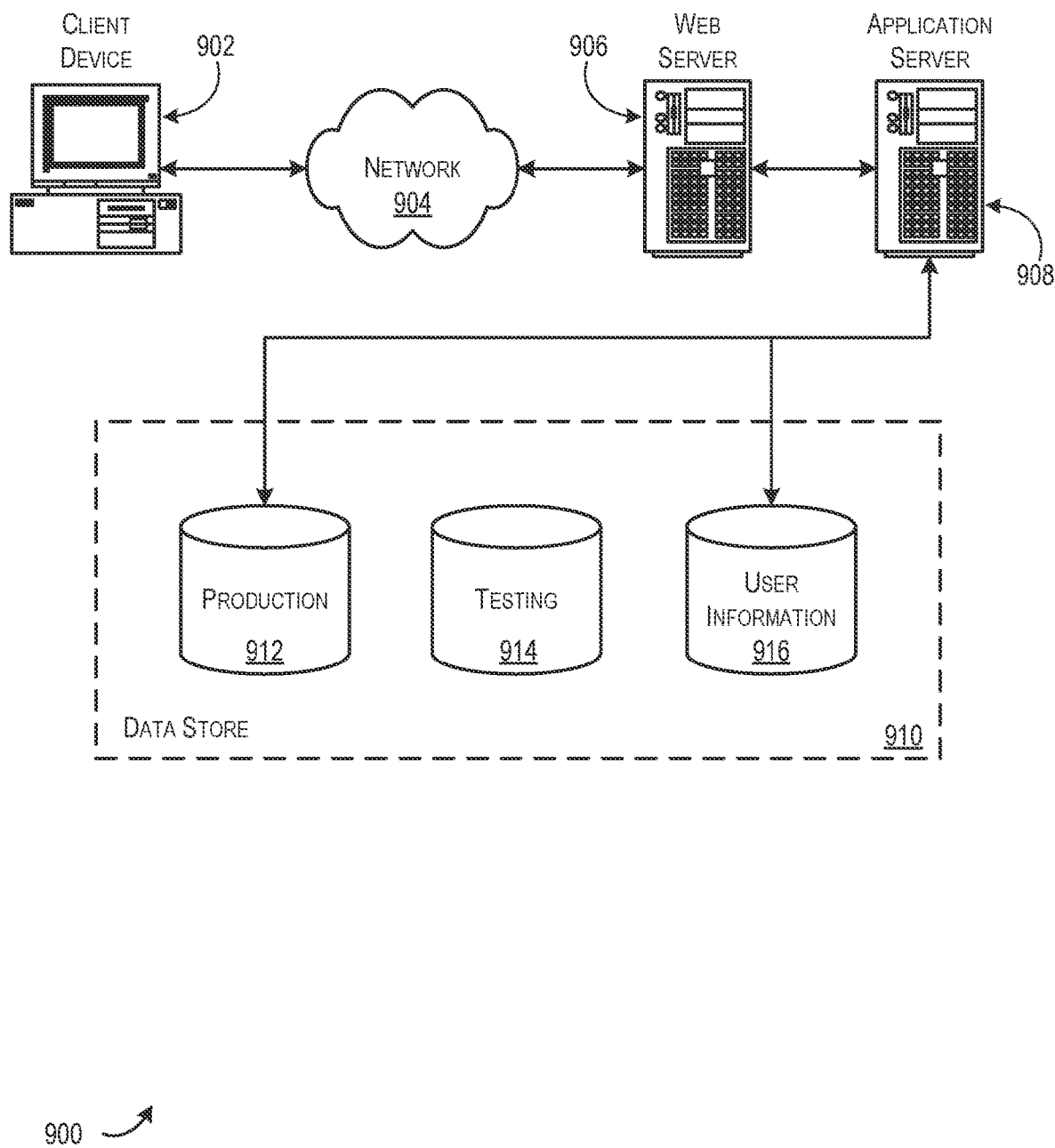
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes a user device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, at a computing device from a first user device, a first streaming request to stream content to the first user device;
    transmitting, from the computing device to a service provider computer, the first streaming request to stream the content to the first user device, wherein transmitting the first streaming request to the service provider computer causes the service provider computer to stream the content to the first user device, the first user device playing the content subsequent to receipt;
    receiving, from the first user device, an index indicating a past position reached during playback at the first user device;
    maintaining, at the computing device, state information associated with a user profile associated with the first user device, the state information comprising the index received from the first user device;
    receiving, at the computing device, a subsequent streaming request;
    in response to the subsequent streaming request, identifying, by the computing device, subsequent content to be streamed to one or more user devices that are different from the first user device, wherein identifying that the subsequent content is to be streamed to the one or more user devices is based at least in part on the state information associated with the user profile;
    transmitting, by the computing device to the service provider computer, a second streaming request to stream the subsequent content to the one or more user devices, wherein transmitting the second streaming request to the service provider computer causes the service provider computer to stream the subsequent content to the one or more user devices, the subsequent content being played at the one or more user devices subsequent to receipt and from the past position reached dining the playback at the first user device; and
    updating, by the computing device, the state information associated with the user profile based at least in part on the subsequent content being streamed to the one or more user devices.

2. The computer-implemented method of claim 1, wherein the subsequent streaming request is received from a second user device, the second user device being different from the first user device.

3. The computer-implemented method of claim 1, wherein the subsequent streaming request includes an indication of the one or more devices to which the subsequent content is to be streamed.

4. The computer-implemented method of claim 1, wherein the content streamed at the first user device is the same content as the subsequent content streamed at the one or more devices.

5. The computer-implemented method of claim 1, wherein the second streaming request comprises the index, and wherein the service provider computer begins streaming the subsequent content according to the index provided in the second streaming request.

6. A computing device, comprising:
one or more processors; and
one or more memories configured with computer-executable instructions that, when executed by the one or more processors, cause the computing device to:
maintain state information describing aspects of historical content streaming associated with a plurality of user devices corresponding to a user profile, the state information comprising respective indices received from respective user devices of the plurality of user devices, an index of the respective indices specifying a past position reached during playback of content at a first user device of the plurality of user devices;
receive a streaming request for the content from a second user device of the plurality of user devices;
select, based at least in part on the state information, the content to be streamed in response to the streaming request; and
transmit a request to a service provider computer, the request indicating the content to be streamed and the index specifying the past position reached during the playback of the content at the first user device, wherein transmitting the request to the service provider computer causes the content to be streamed to one or more user devices of the plurality of user devices beginning at the past position reached during playback of the content at the first user device.

7. The computing device of claim 6, wherein executing the instructions further causes the computing device to select the one or more user devices from the plurality of user devices based at least in part on the request and the state information.

8. The computing device of claim 6, wherein the state information corresponds to a last streaming of the content and further comprises a device identifier for the first user device of the plurality of user devices and a content identifier corresponding to the content streamed at the first user device of the plurality of user devices.

9. The computing device of claim 6, wherein the second user device is one of the one or more user devices at which the content is streamed.

10. The computing device of claim 6, wherein the one or more user devices comprise multiple user devices of the plurality of user devices, wherein each of the multiple user devices is associated with a group identifier, and wherein the request comprises an indication of the group identifier.

11. The computing device of claim 6, wherein the state information comprises a volume level at which the content was previously presented, wherein the request indicates the volume level at which the content was previously presented, and wherein the content is streamed to the one or more user devices at a volume corresponding to the volume level.

12. The computing device of claim 6, wherein the user profile is associated with a subscription identifier, and wherein executing the instructions further causes the computing device to determine that streaming the content to the one or more user devices is allowed based at least in part on the subscription identifier associated with the user profile.

13. The computing device of claim 6, wherein the state information comprises one or more device-specific attributes, wherein the request comprises the one or more device-specific attributes, and wherein a particular version of the content is selected for streaming to the one or more devices based at least in part on the one or more device-specific attributes.

14. A computer-readable storage medium comprising computer-readable instructions that, when executed by one or more processors of a computing device, cause the computing device to perform operations comprising:
receiving, from a first user device, a streaming request for content that was previously played, at least in part, at a second user device;
obtaining state information comprising an index at which playback of the content at the second user device was halted; and
transmitting, to a service provider computer, a subsequent streaming request comprising at least the index and indicating the content is to be played at the first user device, wherein transmitting the subsequent streaming request to the service provider computer causes the service provider computer to stream the content to the first user device for subsequent playback, being streamed to commence the subsequent playback at the first user device at the index at which the playback of the content was halted at the second user device.

15. The computer-readable storage medium of claim 14, wherein the subsequent streaming request comprises an identifier associated with the first user device and a third user device, wherein executing the instructions further causes the computing device to perform further operations comprising identifying the first user device and the third user device based at least in part on the identifier included in the streaming request.

16. The computer-readable storage medium of claim 15, wherein the subsequent streaming request comprises identifiers for the first user device and the third user device, and wherein transmitting the subsequent streaming request further causes the service provider computer to commence playback of the content at the third user device in addition to the first user device.

17. The computer-readable storage medium of claim 14, wherein the state information comprises one or more filter attributes, and wherein the service provider computer selects a particular version of the content to play at the first user device based at least in part on the one or more filter attributes.

18. The computer-readable storage medium of claim 14, wherein the state information comprises one or more device attributes, and wherein the service provider computer selects a particular version of the content to play at the first user device based at least in part on the one or more device attributes.

19. The computer-readable storage medium of claim 14, wherein executing the instructions further causes the computing device to perform further operations comprising:
identifying, from the state information, that a first instance of content and a second instance of content are individually being played at two corresponding user devices; and transmitting, to the second user device, a request to identify the content as being the first instance of content or the second instance of content.

20. The computer-readable storage medium of claim 14, wherein the service provider computer operates as part of a music service.

* * * * *